(12) United States Patent
Shimizu et al.

(10) Patent No.: US 7,163,332 B2
(45) Date of Patent: Jan. 16, 2007

(54) FRONT LIGHT AND REFLECTIVE DISPLAY

(75) Inventors: Tetsu Shimizu, Nara (JP); Motohiko Matsushita, Nara (JP); Akihiro Funamoto, Nara (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 192 days.

(21) Appl. No.: 10/818,754

(22) Filed: Apr. 6, 2004

(65) Prior Publication Data

US 2004/0246698 A1 Dec. 9, 2004

(30) Foreign Application Priority Data

May 23, 2003 (JP) .............................. 2003-146925

(51) Int. Cl.
*F21V 7/04* (2006.01)
(52) U.S. Cl. ...................... 362/619; 362/606; 362/617; 362/628
(58) Field of Classification Search ................ 362/600, 362/606, 617, 625, 626, 628; 349/61–71
See application file for complete search history.

(56) References Cited

OTHER PUBLICATIONS

English translation of Japanese Abstract, publication No.: JP2002025323, publication date Jan. 25, 2002, 1 page.
English translation of Japanese Abstract, publication No.: JP2002042533, publication date Feb. 8, 2002, 1 page.
English translation of Japanese Abstract, publication No.: JP2003107464, publication date Apr. 9, 2003, 1 page.
English translation of Japanese Abstract, publication No.: JP2002258058, publication date Sep. 11, 2002, 1 page.
English translation of Japanese Abstract, publication No.: JP2003107465, publication date Apr. 9, 2003, 1 page.
English translation of Japanese Abstract, publication No.: JP11202784, publication date Jul. 30, 1999, 1 page.
English translation of Japanese Abstract, publication No.: JP2002025323, publication date Jan. 25, 2002, 1 page.
English translation of Japanese Abstract, publication No.: JP2002042533, publication date Feb. 8, 2002, 1 page.
English translation of Japanese Abstract, publication No.: JP2003107464, publication date Apr. 9, 2003, 1 page.
English translation of Japanese Abstract, publication No.: JP2002258058, publication date Sep. 11, 2002, 1 page.
English translation of Japanese Abstract, publication No.: JP2003107465, publication date Apr. 9, 2003, 1 page.
English translation of Japanese Abstract, publication No.: JP11202784, publication date Jul. 30, 1999, 1 page.

*Primary Examiner*—Sandra O'Shea
*Assistant Examiner*—Anabel Ton
(74) *Attorney, Agent, or Firm*—Osha Liang L..L.P.

(57) ABSTRACT

A front light and a reflective display using the same are provided. A light guide of the front light includes a plurality of patterns on the upper surface, each of the patterns including a first surface inclining relative to the light-emitting surface toward the light-entering surface, a second surface substantially perpendicular to the light-emitting surface or inclining relative to the light-emitting surface opposite to the light-entering surface, and a third surface inclining relative to the light-emitting surface toward the light-entering surface.

24 Claims, 12 Drawing Sheets

FRONT LIGHT AND REFLECTIVE DISPLAY

CROSS-REFERENCE TO RELATED APPLICATIONS

This application claims priority from Japanese Application JP2003-146925, filed on May 23, 2003.

BACKGROUND OF THE INVENTION

1. Field of the Invention

This invention relates to a lighting device and a display device using the same, and more particularly to a front light and a reflective display.

2. Description of the Prior Art

In FIG. 1, there is shown a sectional view of a conventional reflective liquid crystal display 1. A reflective liquid crystal display 1 is mainly composed of a liquid crystal display 3 and a front light 2 including a light source 4 and a light guide 5.

According to this display 1, the light, emitted from the light source 4, enters the light-entering surface 8 of the light guide 5 and spreads inside the light guide 5. On the upper side of the light guide 5, there are provided flat portions 6 and a plurality of patterns 7 having a first surface 7a and a second surface 7b. Basically, the light that reaches the first surface 7a is reflected thereon to be emitted from the light-emitting surface 9 toward the liquid crystal display 3. The light emitted from the light-emitting surface 9 is reflected by a reflector 13 provided within the liquid crystal display 3 and passes again through the light guide 5 to be emitted outside. Accordingly, the front light 2 illuminates the liquid crystal display 3, and an observer can recognize an image formed by the liquid crystal display 3.

However, with the use of the front light 2 like this, a part of the light that reaches the first surface 7a is not reflected thereon and passes through the first surface 7a. Some of the light that passed through the first surface 7a reaches the second surface 7b and the rest uselessly comes outside directly.

This useless light decreases the rate of the light amount emitted from the light-emitting surface 9 to the light amount emitted from the light source 4, which resultantly deteriorate the brightness and the contrast of the reflective liquid crystal display 1.

In such a case, in order to improve the brightness and the contrast, more light sources are used or a light source that consumes more electricity is used, which increases the manufacturing cost, the consumption of electricity, or the size of a resultant device.

On the other hand, the edges of the patterns 7 formed on the upper surface of the light guide 5 are curved to some extent because it is difficult to form straight boundaries. Accordingly, in case the light, passed through the first surface 7a, reaches the boundary portion, the light is uselessly reflected toward an observer, which makes the image whitish to deteriorate the visibility.

SUMMARY OF THE INVENTION

According to one preferred embodiment of the present invention, there is provided a front light including a light guide and a light source disposed at one side of the light guide, the light guide including a light-entering surface where the light from the light source enters, a light-emitting surface where the light from the light source is emitted outwardly, and a light-reflecting surface opposed to the light-emitting surface, the light-reflecting surface having a plurality of patterns formed thereon, each of the patterns including a first surface inclining relative to the light-emitting surface toward the light-entering surface, the second surface substantially perpendicular to the light-emitting surface or inclining relative to the light-emitting surface opposite to the light-entering surface, and the third surface inclining relative to the light-emitting surface toward the light-entering surface.

According to one preferred embodiment of this invention, there is provided a reflective display including a front light and a display device having a reflecting surface for reflecting the light emitted from the front light. The front light includes a light guide and a light source disposed at one side of the light guide, the light guide including a light-entering surface where the light from the light source enters, a light-emitting surface where the light from the light source is emitted outwardly, and a light-reflecting surface opposed to the light-emitting surface, the light-reflecting surface having a plurality of patterns formed thereon, each of the patterns comprising a first surface inclining relative to the light-emitting surface toward the light-entering surface, a second surface substantially perpendicular to the light-emitting surface or inclining relative to the light-emitting surface opposite to the light-entering surface, and a third surface inclining relative to the light-emitting surface toward the light-entering surface.

Features and advantages of the present invention will become apparent from a reading of the following specification, in conjunction with the drawings and the appended claims.

DESCRIPTION OF THE PREFERRED EMBODIMENT

Referring now in more details to the drawings, in which like numerals indicate like pars throughout the several views, several preferred embodiments of the present invention are provided. The dimensions, materials, configurations, the relative arrangements of components described in the embodiments are intended to be typical or illustrative, rather than limiting.

First Embodiment

Figure 1:
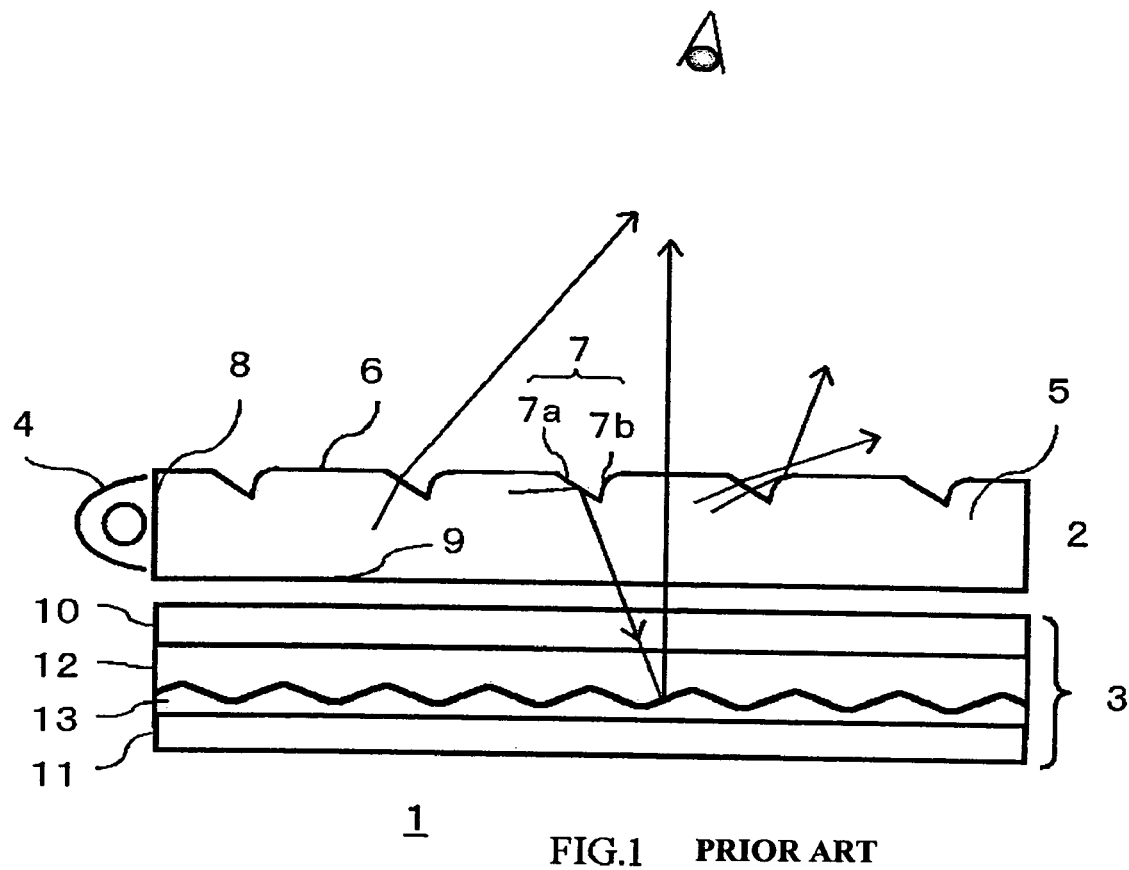
FIG. 1 is a sectional view of a conventional reflective liquid crystal display.
Figure 2:
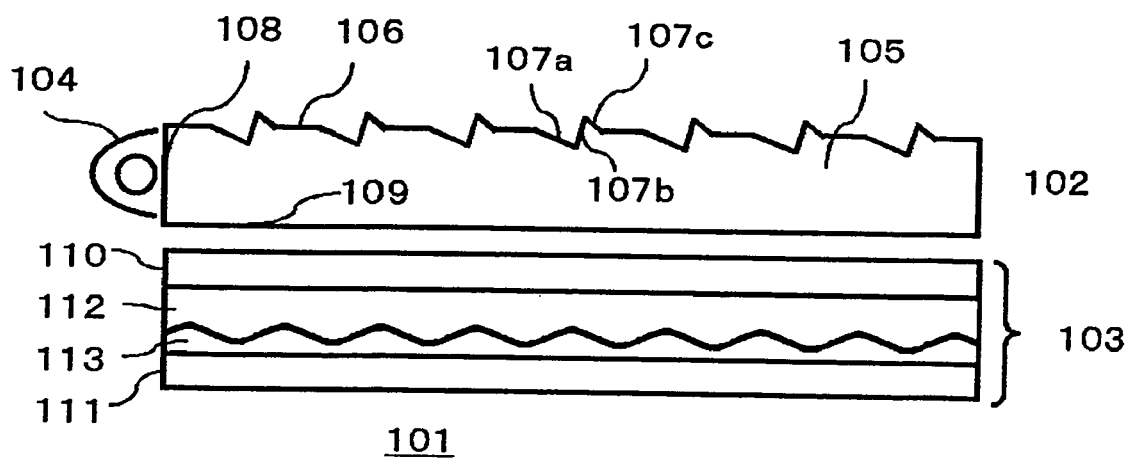
FIG. 2 is a sectional view of a reflective liquid crystal display according to an embodiment of the present invention.

In FIG. 2, there is shown a simplified sectional view of a reflective liquid crystal display 101 according to one embodiment of the present invention. The principal structure of the display 101 is similar to that of a conventional display shown in FIG. 1.

On the upper side of the light guide 105, there are provided flat portions 106 and a plurality of patterns 107 having a first surface 107a inclining relative to the light-emitting surface 109 toward the light-entering surface 108, a second surface 107b substantially perpendicular to the light-emitting surface 109 or inclining relative to the light-emitting surface 109 opposite to the light-entering surface 108, and a third surface 107c inclining relative to the light-emitting surface 109 toward the light-entering surface 104. The light guide 105 is made by transparent resin such as polycarbonate resin and acrylic resin, and manufactured using injection molding, casting, embossment or the like.

Figure 3:
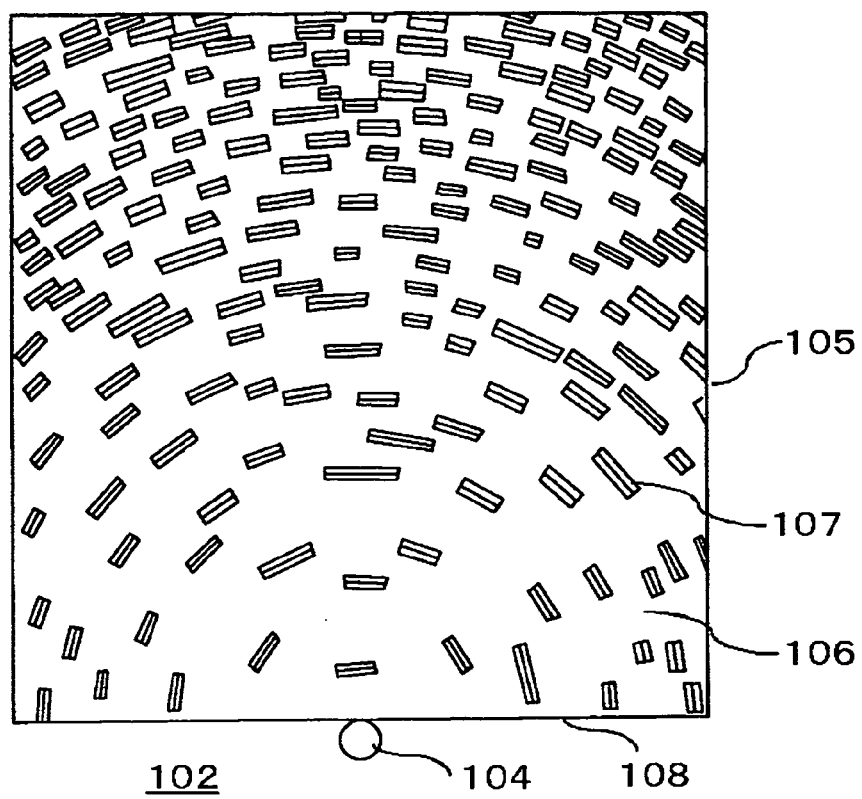
FIG. 3 is a plan view of a front light according to an embodiment of the present invention.
Figure 4:
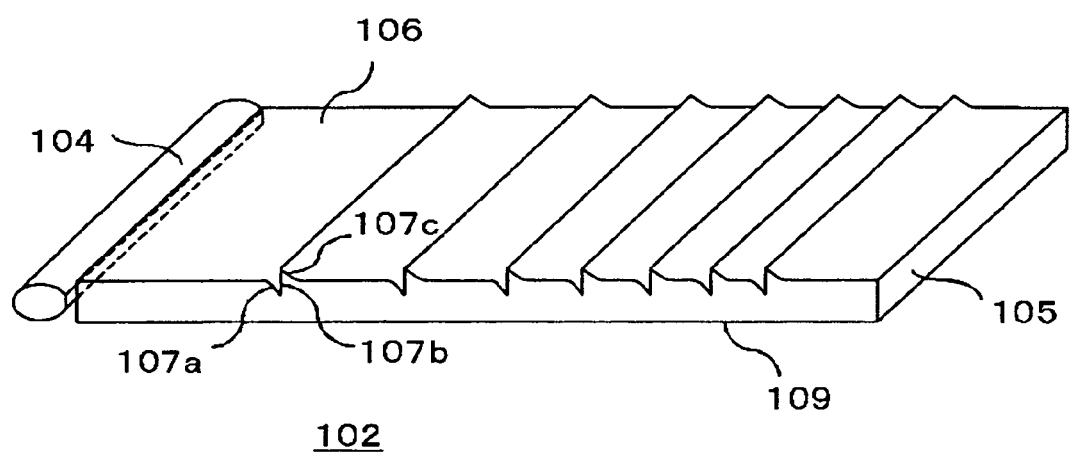
FIG. 4 is a perspective view of a front light according to an embodiment of the present invention.

A light source 104 can typically be a point light source that is disposed at the center of a light-entering surface 108 as shown in FIG. 3 or a linear light source that is disposed at one side of the light guide 105 as shown in FIG. 4. With reference to FIG. 3, each pattern 107 is provided on a concentric circle whose center is at the center of luminous area of the light source 104. It is preferable that the patterns 107 are arranged closely as they separate from the light source 104, so that light is emitted from the light-emitting surface 109 uniformly.

Figure 5:
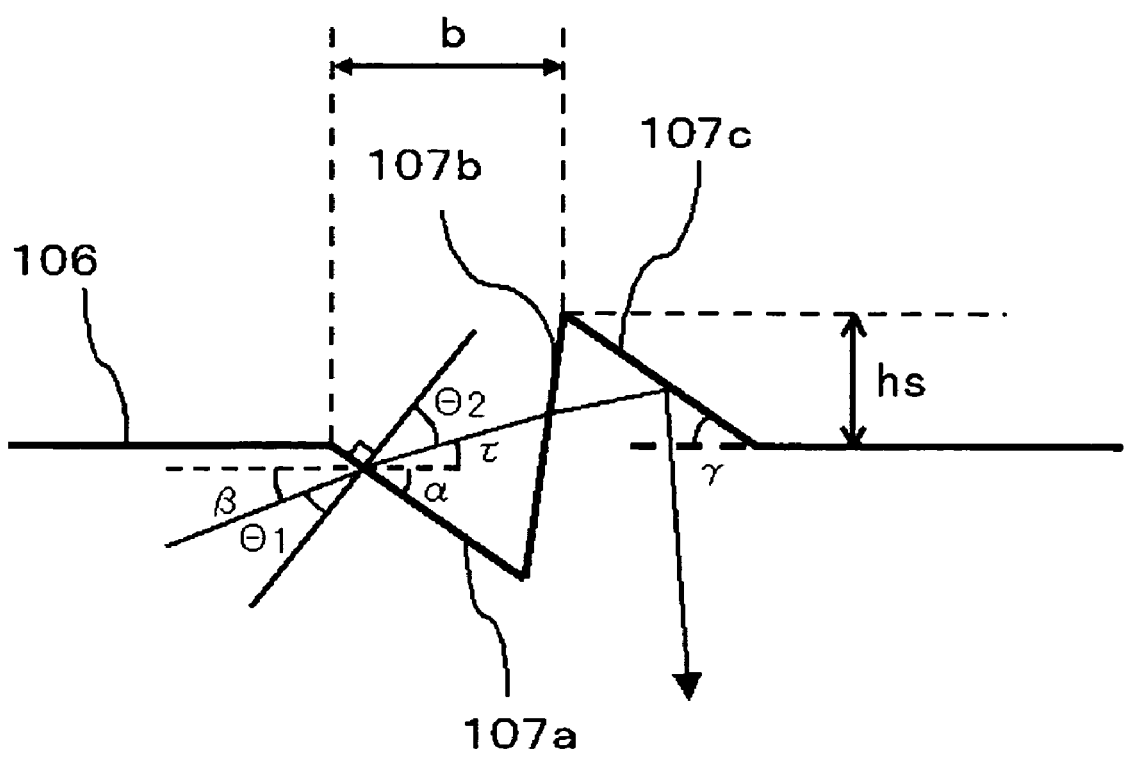
FIG. 5 is an enlarged sectional view of the pattern illustrated in FIG. 1.

FIG. 5 shows an enlarged sectional view of a pattern 107 shown in FIG. 2. Each pattern 107 is typically in triangle shape in section. An angle of inclination of the first surface 107a is determined so that most of light, which reaches the first surface 107a, is totally reflected thereon and passes through the light-emitting surface 109. The second surface 107b protrudes from the flat portion 106 so that most of light, which passed through the first surface 107a, reaches the second surface 107b. This means that light passing through the first surface 107a with the maximum angle relative to the light-emitting surface 109 reaches the second surface 107b.

Assuming the flat portion 106 and the light-emitting surface 109 are parallel to each other, the height of the second surface 107b is described hereinafter. As shown in FIG. 5, it is assumed that an angle of inclination of the first surface relative to the light-emitting surface 109 is $\alpha$, an angle relative to the light-emitting surface 109 with which the light reaches the first surface 107a is $\beta$, an incident angle of the incident light is $\theta1$, the refractive index of the light guide 105 is n, a horizontal distance from a boundary between the flat portion 106 and the first surface 107a to a boundary between the second surface 107b and the third surface 107c is b, and an exit angle of the light passing through the first surface 107a is $\theta2$.

In this case, an incident angle $\theta1$ satisfies the following equation 1.

$$\theta1 = 90° - \alpha - \beta \tag{1}$$

An exit angle $\theta2$ satisfies the following equation 2.

$$\sin\theta2 = n \cdot \sin\theta1 \tag{2}$$

An angle relative to the light-emitting surface 109 with which the light passes through the first surface 107a satisfies the following equation 3.

$$\tau = 90° - \alpha - \theta2 \tag{3}$$

The light passing through the first surface 107a close to the boundary with the flat portion 106 reaches a spot on the second surface 107b whose height from the flat portion 106 is h satisfying the following equation 4.

$$h = b \cdot \tan\tau \tag{4}$$

Therefore, if the top end of the second surface 107b is provided with height hs, which is higher than h, the light passing through the first surface 107a reaches the second surface 107b and enters again the light guide 105. It is preferable that the height hs is sufficiently higher than h, when it is considered that some edges of the patterns 107 are formed blunt during manufacturing. Specifically, if the height hs is given by the following equation 5, all the light passing through the first surface 107a reaches the second surface 107b.

$$hs = \kappa \cdot b \cdot \tan\tau \tag{5}$$

Using the equations 1 to 3, $\tau$ satisfies the equation 6.

$$\tau = 90° - \alpha - \arcsin[n \cdot \cos(\alpha+\beta)] \tag{6}$$

$\kappa$ is a coefficient that is given by an experimental result or a simulated result by a computer. $\kappa$ is preferably not more than 2 in consideration of manufacturing of the patterns 107.

More specifically, assuming an angle $\alpha$ is 50°, the refractive index n is 1.53, and a horizontal distance b is 4 μm, an angle $\beta$ is 40°, $\tau$ is calculated as 40° by the equation 6. Therefore, the height hs is calculated as 3.7 μm by the equation 5 wherein $\kappa$ is 1.1.

The third surface 107c is described hereinafter. The light that re-enters the light guide 105 at the second surface 107b is preferably used as illuminating light for the liquid crystal display 103. The light that passes through the first surface 107a and enters the second surface 107b should accordingly be totally reflected by the third surface 107c with the same angle of reflection as the light that is totally reflected by the first surface 107a.

Figure 6:
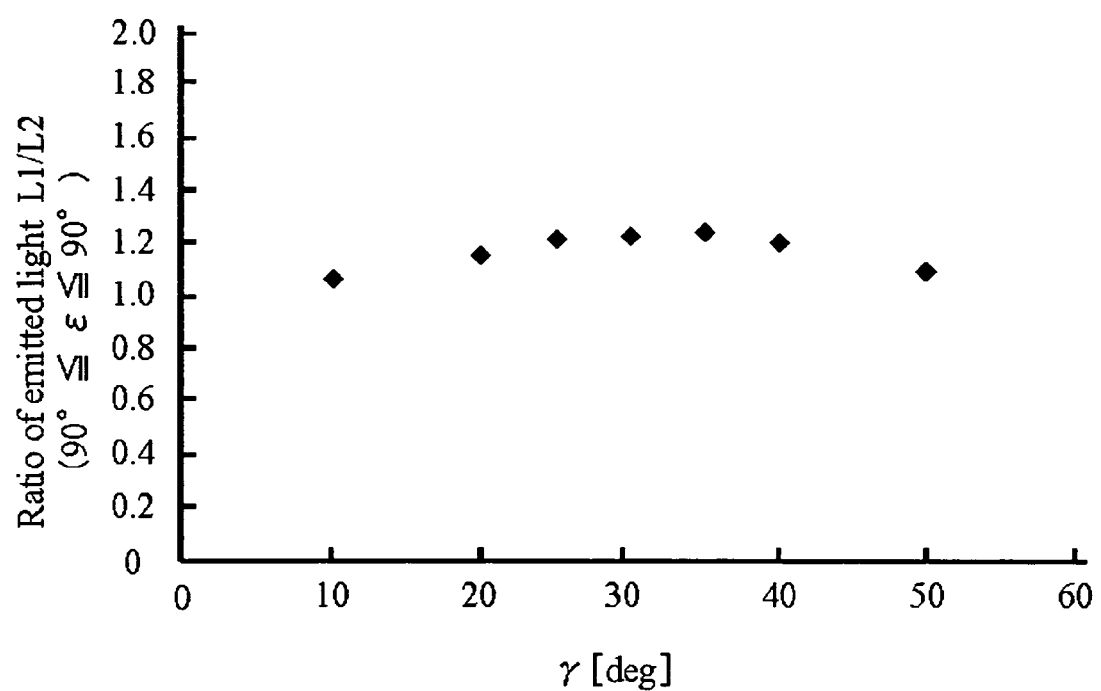
FIG. 6 is an experimental result showing an amount of the light emitted from the light-emitting surface.
Figure 7:
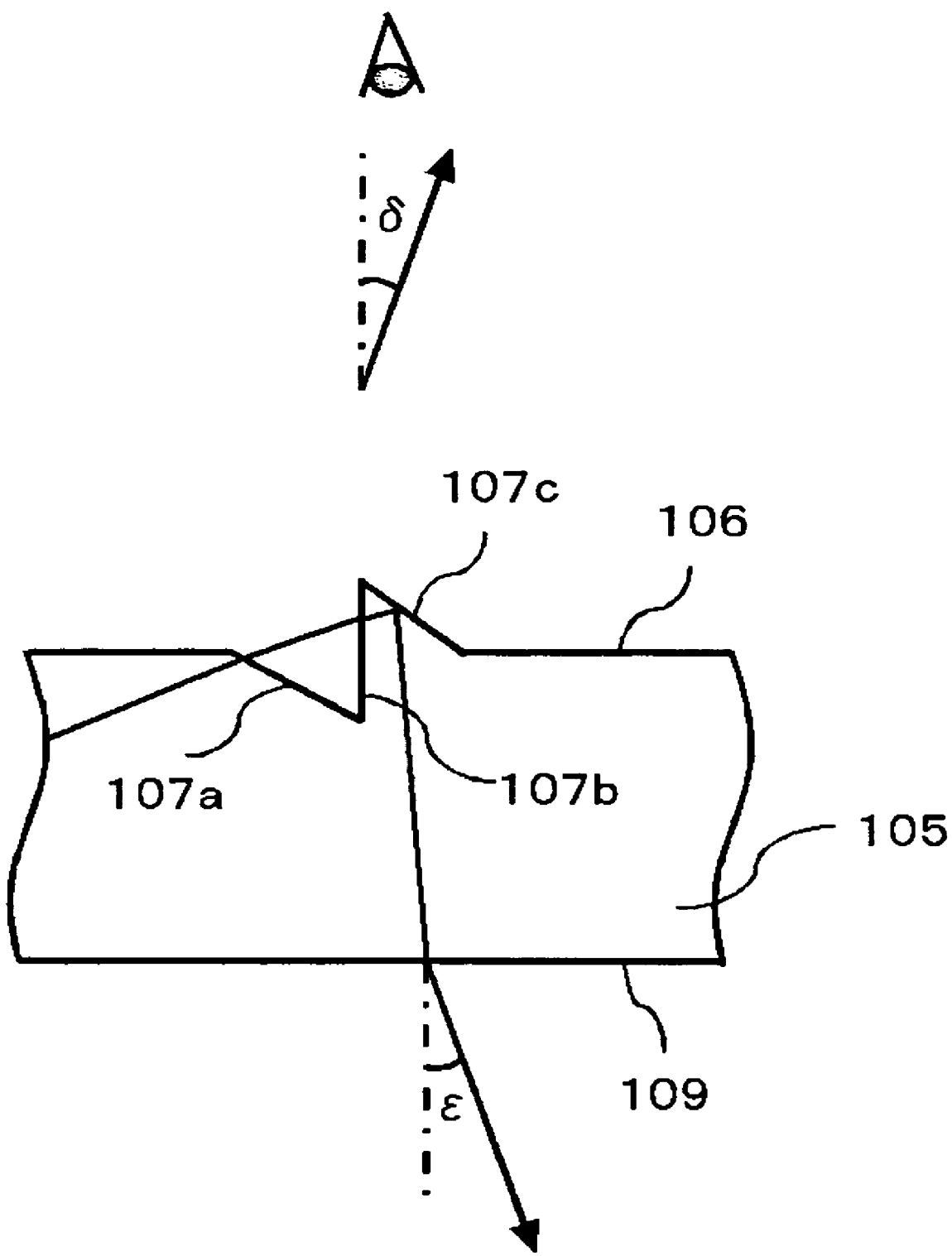
FIG. 7 is a partial sectional view of the light guide for explaining an angle $\epsilon$ and an angle $\delta$.

In FIG. 6, there is provided an experimental result showing an amount of the light emitted from the light-emitting surface 109 when an angle of inclination $\alpha$ is fixed as 50° and an angle of inclination $\gamma$ is varied. The x-axis indicates an angle of inclination $\gamma$. The y-axis indicates the ratio of the amount of the light L1 emitted from the light guide having both the first surface 107a and the third surface 107c to the amount of the light L2 emitted from the light guide having the first surface 107a only. It is assumed that each of the comparative light guides has the equally formed first surface 107a at the same place. Assuming an exit angle of the light emitted from the light-emitting surface 109 is $\epsilon$ as shown in FIG. 7, the amount of all emitted light whose exit angle $\epsilon$ is from −90 to 90° is measured.

Figure 8:
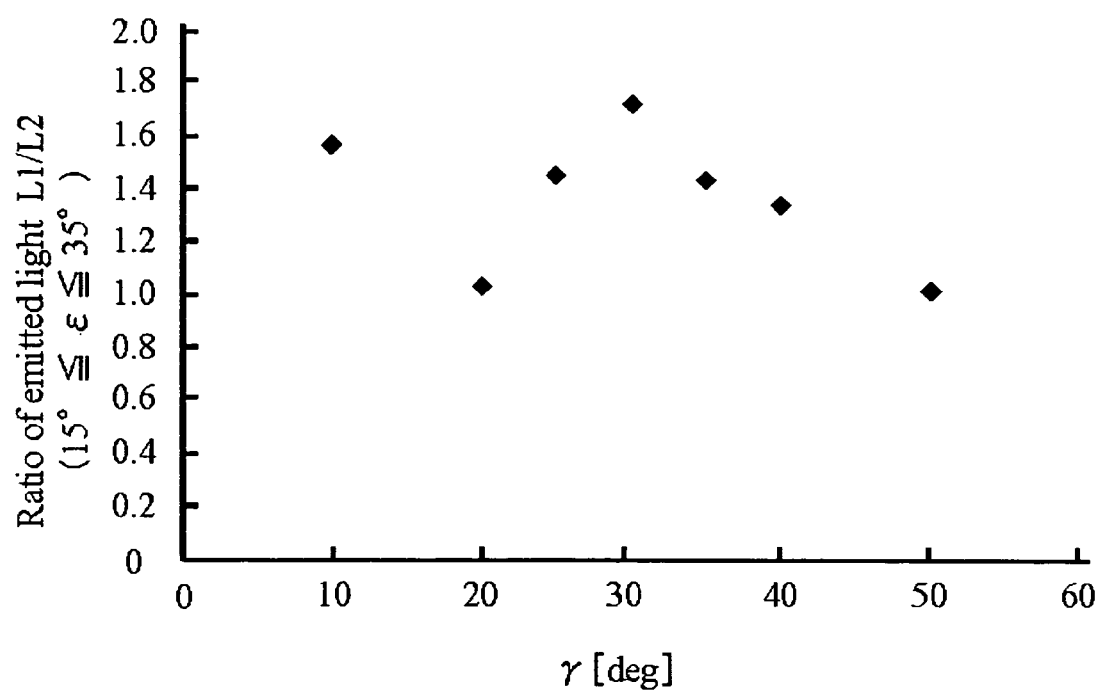
FIG. 8 is another experimental result showing an amount of the light emitted from the light-emitting surface.

It is understood from FIG. 6 that the amount of the light L1 is more than the amount of the light L2 when an angle of inclination γ is from 10° to 50°. It is more preferable that an angle of inclination γ is from 20° to 40°. The ratio L1/L2 is maximum when an angle of inclination γ is 35°. Accordingly, the light guide 105 having the third surface 107c whose inclination angle γ is from 10° to 50° advantageously reduces loss of light. In FIG. 8, there is provided another experimental result showing an amount of the emitted light whose exit angle ε is from 15° to 35°. It is understood from FIG. 6 that the ratio L1/L2 is maximum when an angle of inclination γ is around 30°.

Figure 9:
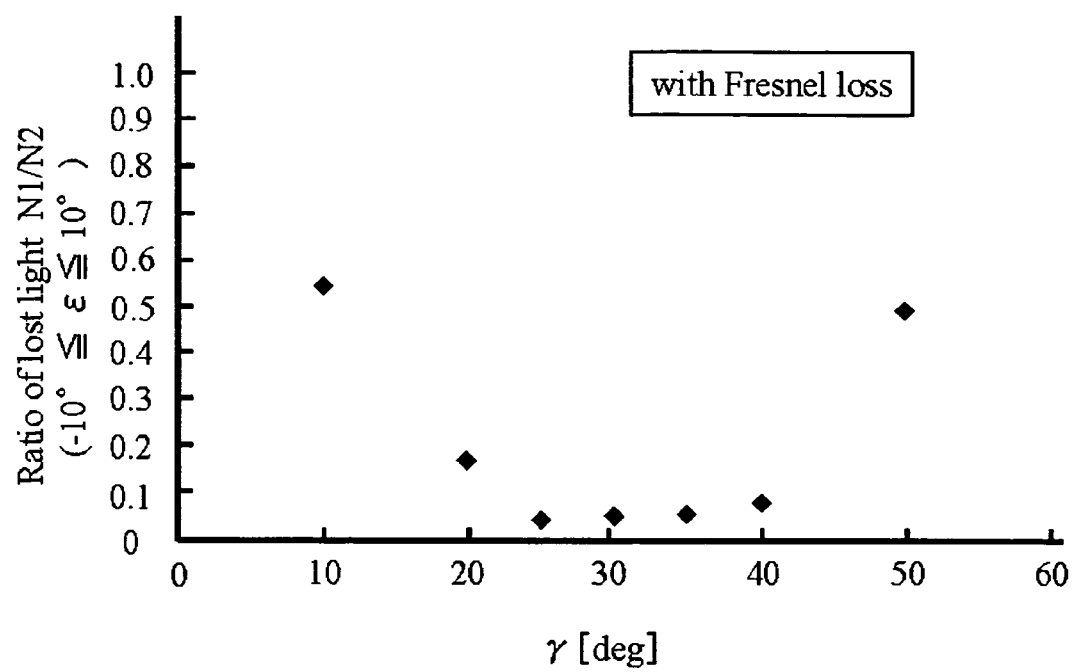
FIG. 9 is an experimental result showing an amount of lost light.
Figure 10:
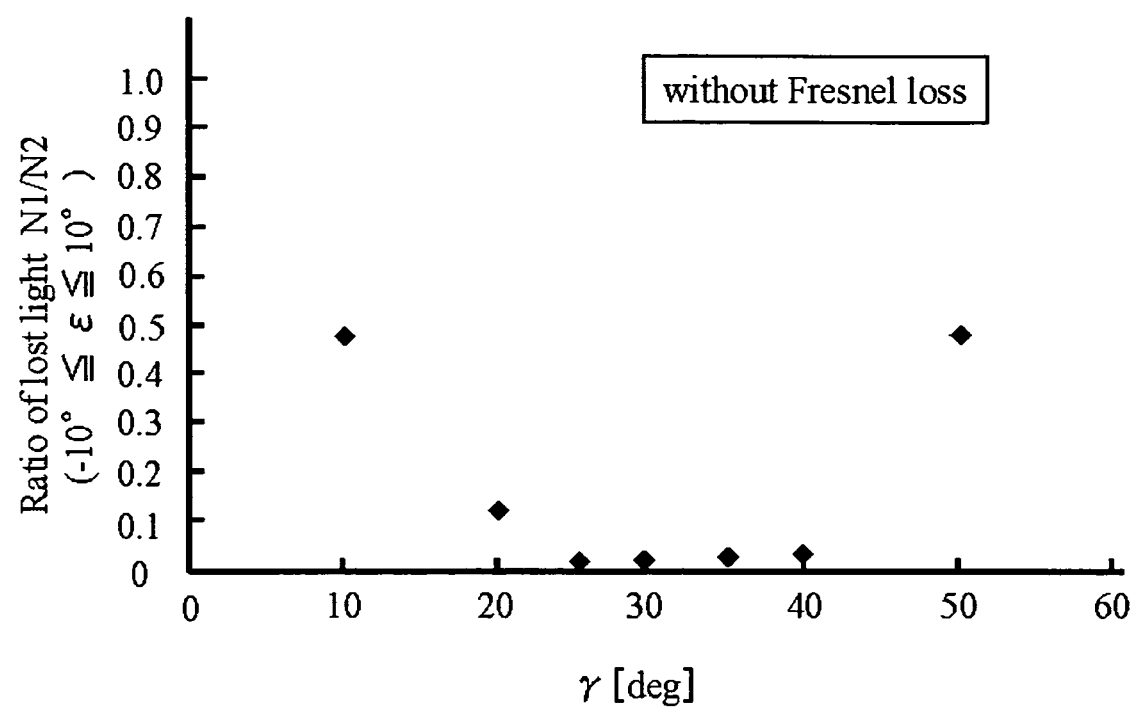
FIG. 10 is another experimental result showing an amount of lost light.
Figure 11A:
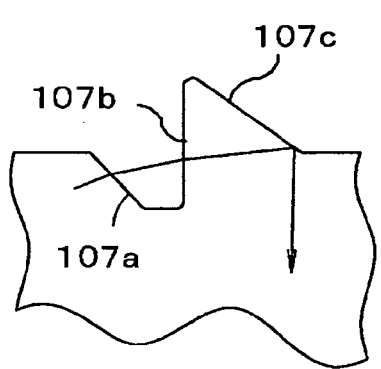
FIGS. 11A, 11B, 11C, and 11D are enlarged sectional views of the patterns.
Figure 11C:
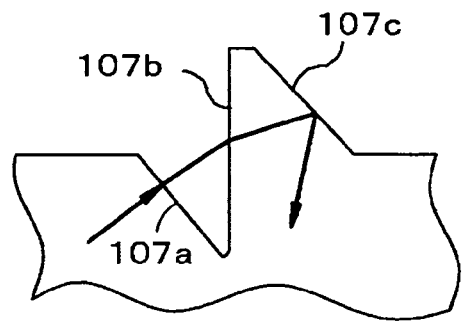
Figure 11B:
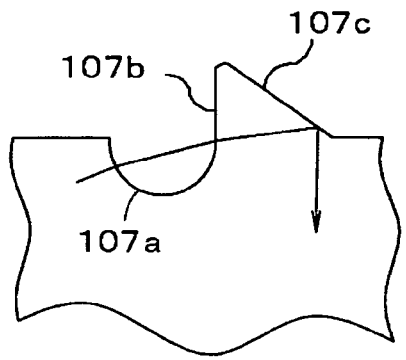
Figure 11D:
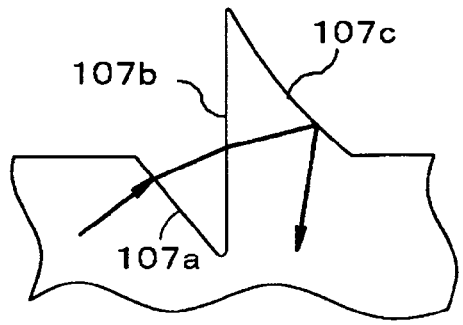

In FIG. 9, there is provided an experimental result showing an amount of lost light when an angle of inclination α is fixed as 50° and an angle of inclination γ is varied. The x-axis indicates an angle of inclination γ. The y-axis indicates the ratio of the amount of lost light N1 from the light guide having both the first surface 107a and the third surface 107c to the amount of lost light N2 from the light guide having the first surface 107a only. Assuming lost light is observed with an incident angle δ by an observer as shown in FIG. 7, the amount of lost light whose incident angle δ is from −10° to 10° is measured. In FIG. 9, the amount of surface reflection (Fresnel loss) on the light-emitting surface 109 is also measured. In FIG. 10, Fresnel loss is removed. With reference to FIG. 10, it is understood that little amount of lost light is observed when an angle of inclination γ is from 25° to 40° and that the amount of lost light is sufficiently reduced when an angle of inclination γ is 20°.

Accordingly, when an angle of inclination α is 50°, an angle of inclination γ is preferably from 10° to 50°, which increases the amount of emitted light from the light-emitting surface 109 and decreases the amount of lost light observed by an observer. More preferably, an angle of inclination γ is from 20° to 40°. Furthermore, it is expected that when an angle of inclination α is 50° and angle of inclination γ is 30°, a direction in which the light is totally reflected by the first surface 107a and a direction in which the light is totally reflected by the third surface 107c are substantially the same, which simplifies designing a reflecting surface of the reflector 113.

Figure 12:
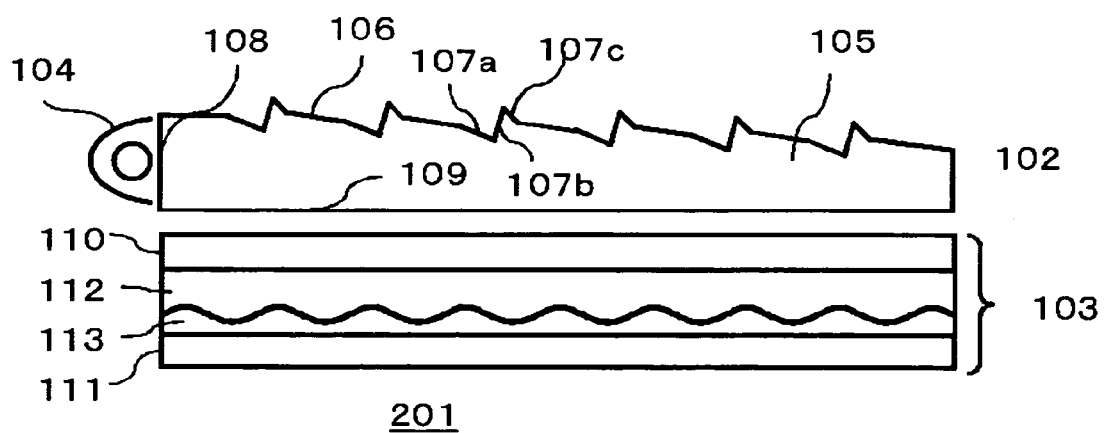
FIG. 12 is a sectional view of a reflective liquid crystal display according to an embodiment of the present invention.
Figure 13:
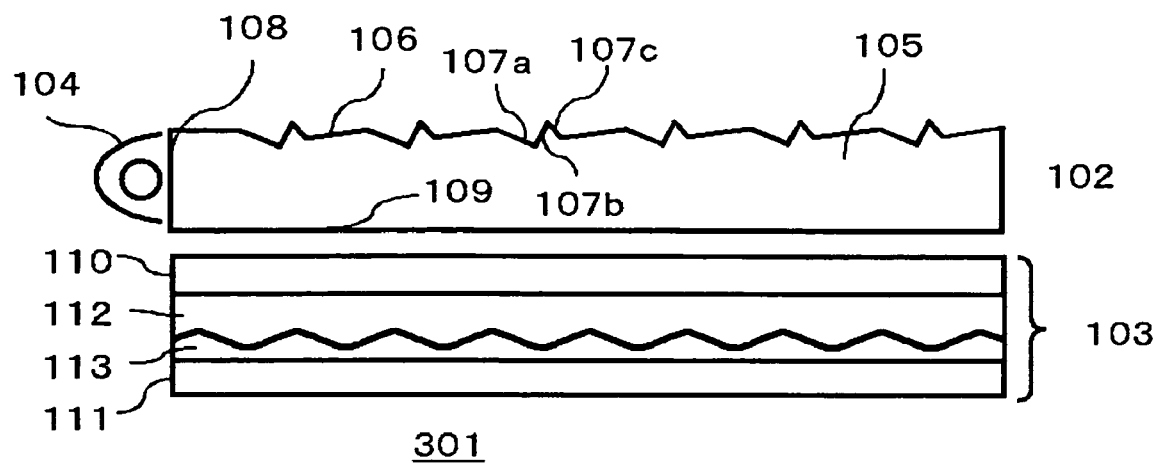
FIG. 13 is a sectional view of a reflective liquid crystal display according to an embodiment of the present invention.

Several experimental results in which an angle of inclination α is 50° have been exemplarily described in this embodiment, but an angle of inclination α is variable. The patterns are not necessarily triangle shape in section, and any shapes as shown in FIG. 11, that are expected to be effective, are adopted. The flat portion 106 is not necessarily parallel to the light-emitting surface 109. The flat portion 106 can be inclined relative to the light-emitting surface 109 as shown in FIGS. 12 and 13.

Second Embodiment

Figure 14:
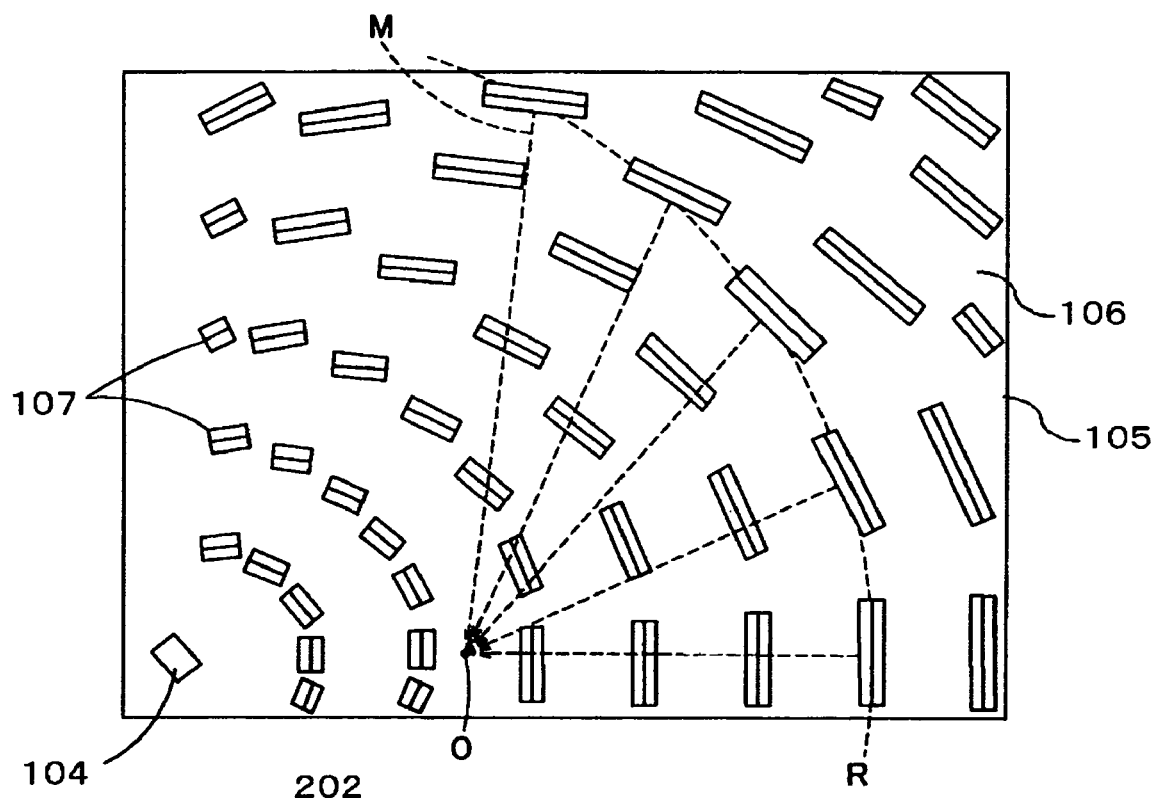
FIG. 14 is a plan view of a front light according to an embodiment of the present invention.

In FIG. 14, there is shown a plan view of a front light 202 according to another embodiment of the present invention. With reference to FIG. 14, a light source 104 is provided in the corner of a light guide 105. The arrangement of the patterns 107 is described hereinafter. The patterns 107 are provided so that the light reflected by the patterns 107 emits from the light-emitting surface 109 substantially in the same direction throughout the light-emitting surface 109. Specifically, the patterns 107 are provided on a concentric circle R whose center is at a position of the point light source 104, and a normal M of the first surface 107a of one pattern 107 intersects a normal M of the first surface 107a of another pattern 107 provided on the same circle R at a point O.

Figure 15:
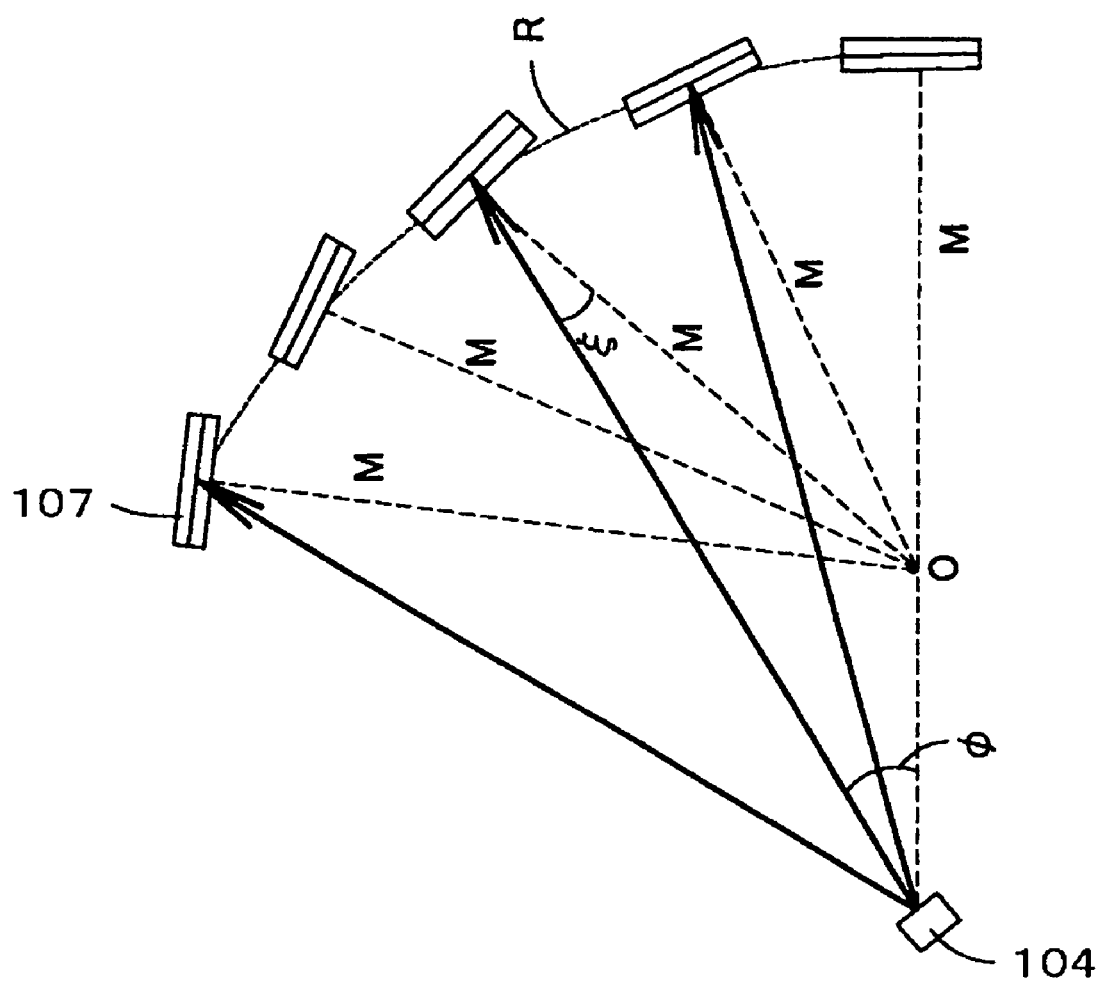
FIG. 15 is a partially enlarged plan view of a front light illustrated in FIG. 14.
Figure 16A:
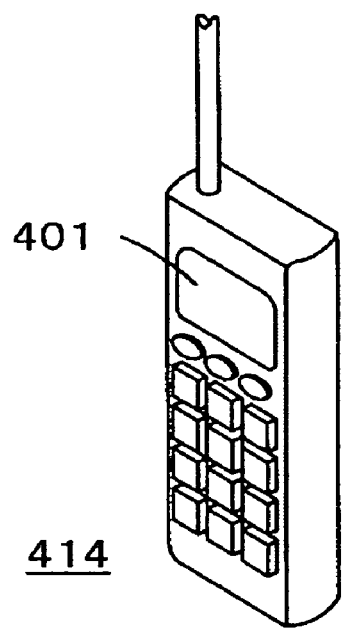
FIGS. 16A and 16B are respectively perspective views of a mobile phone and a personal digital assistant.
Figure 16B:
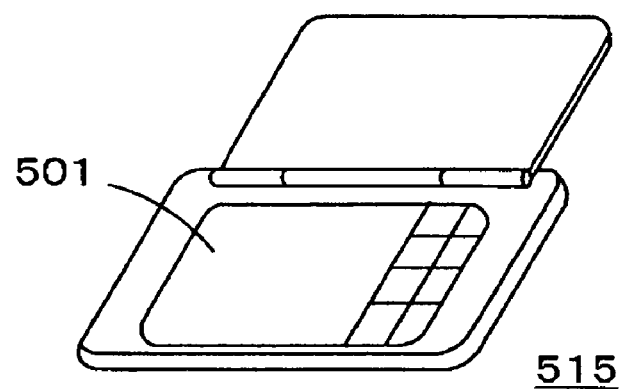

FIG. 15 shows a partially enlarged view of FIG. 14. With reference to FIG. 15, the arrangement of the patterns 107 will be described in detail hereinafter. An angle ξ is defined between a normal M of the first surface 107a and a line connecting the light source 104 (hypothetical starting point) and the first surface 107a. An angle φ is defined between a line connecting the point O and the light source 104 and a line connecting the light source 104 and the first surface 107a. Assuming an incident angle of the light, reflected by the first surface 107a, into the light-emitting surface 109 is ζ1, ξ satisfies the following equation 7 so that a normal M of the first surface 107a of one pattern 107 intersects a normal M of the first surface 107a of another pattern 107 provided on the same circle R at the point O.

$$\xi = \arccos\left(\frac{1 - \cos\phi \cdot \sin\zeta 1}{\sqrt{1 + \sin^2\zeta 1 - 2 \cdot \sin\zeta 1 \cdot \cos\phi}}\right) \quad (7)$$

Furthermore, it is more preferable that a normal M of the third surface 107c of one pattern 107 intersects a normal M of the third surface 107c of another pattern 107 provided on the same circle at one point, so that a direction in which the light is totally reflected by the first surface 107a and a direction in which the light is totally reflected by the third surface 107c are substantially the same. In such a case, a normal M of the first surface 107a of one pattern 107 is substantially parallel to a normal M of the first surface 107a of another pattern 107 provided on the same line connecting the light source 104 and the pattern 107. According to the arrangement of the patterns 107 as described above, it is expected that the light be emitted from the light-emitting surface 109 in substantially the same direction, which simplifies designing a reflecting surface of the reflector 113.

A front light or a reflective display using the front light according to the present invention can be used for various display devices. FIG. 15A shows a preferred embodiment of a mobile phone 414 having a reflective display 401. FIG. 15B shows a preferred embodiment of a personal digital assistant 515 having a reflective display 501.

In this specification, the word "a point light source" is defined as a light source having a broader meaning than an "ideal point light source". A point light source emits light ideally from a point, but it does actually from a finite luminous area. When an angle defined between two lines connecting any point on a light-emitting surface of the light guide and both ends of the luminous area of the point light source is not more than 10° in 50 percent or more of the light-emitting surface, such light source is referred to as a point light source, the light of which is precisely controlled. When an angle defined between two lines connecting any point on a light-emitting surface of the light guide and both ends of the luminous area of the point light source is not more than 25° in 50 percent or more of the light-emitting surface, such light source can also be referred to as a point light source, the light of which is well controlled. A point light source may have a plurality of luminous points that are located closely enough each other.

The specification has thus described in several embodiments the front light of the present invention including the manufacture and use thereof. It is to be understood, however, that numerous changes and variations may be made in the construction of the present invention. It should therefore be understood that modification to the present invention may be made without departing from the scope of thereof as set forth in the appended claims.

What is claimed is:

1. A front light, comprising:
   a light guide; and
   a light source disposed at one side of the light guide, the light guide comprising a light-entering surface where the light from the light source enters, a light-emitting surface where the light from the light source is emitted outwardly, and a light-reflecting surface opposed to the light-emitting surface,
   the light-reflecting surface having a plurality of patterns formed thereon,
   each of the patterns comprising a first surface inclining relative to the light-emitting surface toward the light-entering surface, a second surface substantially perpendicular to the light-emitting surface or inclining relative to the light-emitting surface opposite to the light-entering surface, and a third surface inclining relative to the light-emitting surface toward the light-entering surface,
   wherein an angle of inclination of the second surface against the light-emitting surface is between 80 degrees and 90 degrees, and
   wherein an angle of inclination of the third surface against the light-emitting surface is between 10 degrees and 50 degrees.

2. The front light according to claim 1, wherein the top end of the second surface is higher than the top end of the first surface.

3. The front light according to claim 1, wherein the longer side of the patterns is substantially parallel to the light source.

4. The front light according to claim 1, wherein the longer side of the patterns is substantially perpendicular to the optical axis of the light source.

5. The front light according to claim 1, wherein the distance from the light-emitting surface to the top end of the second surface is determined so that the light which enters the first surface with the minimum incident angle reaches the second surface.

6. The front light according to claim 3, wherein the light-reflecting surface is substantially parallel to the light-emitting surface.

7. The front light according to claim 3, wherein a thickness of the light guide becomes thinner in a direction from the light-entering surface to an opposite surface.

8. A front light, comprising:
   a light guide; and
   a light source disposed at one side of the light guide,
   the light guide comprising a light-entering surface where the light from the light source enters, a light-emitting surface where the light from the light source is emitted outwardly, and a light-reflecting surface opposed to the light-emitting surface,
   the light-reflecting surface having a plurality of patterns formed thereon,
   each of the patterns comprising a first surface inclining relative to the light-emitting surface toward the light-entering surface, a second surface substantially perpendicular to the light-emitting surface or inclining relative to the light-emitting surface opposite to the light-entering surface, and a third surface inclining relative to the light-emitting surface toward the light-entering surface,
   wherein an angle of inclination of the second surface against the light-emitting surface is between 80 degrees and 90 degrees, and
   wherein an angle of inclination of the third surface against the light-emitting surface is between 20 degrees and 40 degrees.

9. A front light, comprising:
   a light guide; and
   a light source disposed at one side of the light guide,
   the light guide comprising a light-entering surface where the light from the light source enters, a light-emitting surface where the light from the light source is emitted outwardly, and a light-reflecting surface opposed to the light-emitting surface,
   the light-reflecting surface having a plurality of patterns formed thereon,
   each of the patterns comprising a first surface inclining relative to the light-emitting surface toward the light-entering surface, a second surface substantially perpendicular to the light-emitting surface or inclining relative to the light-emitting surface opposite to the light-entering surface, and a third surface inclining relative to the light-emitting surface toward the light-entering surface,
   wherein an angle at which the most light is emitted from the light-emitting surface after reflected by the first surface and an angle at which the most light is emitted from the light-emitting surface after entering the second surface are substantially the same.

10. The front light according to claim 9, wherein the top end of the second surface is higher than the top end of the first surface.

11. The front light according to claim 9, wherein the longer side of the patterns is substantially parallel to the light source.

12. The front light according to claim 9, wherein the longer side of the patterns is substantially perpendicular to the optical axis of the light source.

13. The front light according to claim 9, wherein the distance from the light-emitting surface to the top end of the second surface is determined so that the light which enters the first surface with the minimum incident angle reaches the second surface.

14. A reflective display, comprising:
    a front light comprising:
       a light guide; and
       a light source disposed at one side of the light guide,
       the light guide comprising a light-entering surface where the light from the light source enters, a light-emitting surface where the light from the light source is emitted outwardly, and a light-reflecting surface opposed to the light-emitting surface,
    the light-reflecting surface having a plurality of patterns formed thereon,
    each of the patterns comprising a first surface inclining relative to the light-emitting surface toward the light-entering surface, a second surface substantially perpendicular to the light-emitting surface or inclining relative to the light-emitting surface opposite to the light-entering surface, and a third surface inclining relative to the light-emitting surface toward the light-entering surface; and
    a display device, disposed at the side of the light-emitting surface of the front light, comprising a reflecting surface for reflecting the light emitted from the front lights
    wherein the top end of the second surface is higher than the top end of the first surface.

15. The reflective display according to claim 14, wherein, the longer side of the patterns is substantially perpendicular to the optical axis of the light source.

16. A reflective display, comprising:
a front light comprising:
a light guide; and
a light source disposed at one side of the light guide,
the light guide comprising a light-entering surface where the light from the light source enters, a light-emitting surface where the light from the light source is emitted outwardly, and a light-reflecting surface opposed to the light-emitting surface,
the light-reflecting surface having a plurality of patterns formed thereon,
each of the patterns comprising a first surface inclining relative to the light-emitting surface toward the light-entering surface, a second surface substantially perpendicular to the light-emitting surface or inclining relative to the light-emitting surface opposite to the light-entering surface, and a third surface inclining relative to the light-emitting surface toward the light-entering surface; and
a display device, disposed at the side of the light-emitting surface of the front light, comprising a reflecting surface for reflecting the light emitted from the front light,
wherein the longer side of the patterns is substantially parallel to the light source.

17. The reflective display according to claim 16, wherein the light-reflecting surface is substantially parallel to the light-emitting surface.

18. The reflective display according to claim 16, wherein, in the front light, a thickness of the light guide becomes thinner in a direction from the light-entering surface to an opposite surface.

19. A reflective display, comprising:
a front light comprising:
a light guide; and
a light source disposed at one side of the light guide,
the light guide comprising a light-entering surface where the light from the light source enters, a light-emitting surface where the light from the light source is emitted outwardly, and a light-reflecting surface opposed to the light-emitting surface,
the light-reflecting surface having a plurality of patterns formed thereon,
each of the patterns comprising a first surface inclining relative to the light-emitting surface toward the light-entering surface, a second surface substantially perpendicular to the light-emitting surface or inclining relative to the light-emitting surface opposite to the light-entering surface, and a third surface inclining relative to the light-emitting surface toward the light-entering surface; and
a display device, disposed at the side of the light-emitting surface of the front light, comprising a reflecting surface for reflecting the light emitted from the front light,
wherein an angle of inclination of the second surface against the light-emitting surface is between 80 degrees and 90 degrees, and
wherein an angle of inclination of the third surface against the light-emitting surface is between 10 degrees and 50 degrees.

20. The reflective display according to claim 19, wherein the longer side of the patterns is substantially perpendicular to the optical axis of the light source.

21. A reflective display, comprising:
a front light comprising:
a light guide; and
a light source disposed at one side of the light guide,
the light guide comprising a light-entering surface where the light from the light source enters, a light-emitting surface where the light from the light source is emitted outwardly, and a light-reflecting surface opposed to the light-emitting surface,
the light-reflecting surface having a plurality of patterns formed thereon,
each of the patterns comprising a first surface inclining relative to the light-emitting surface toward the light-entering surface, a second surface substantially perpendicular to the light-emitting surface or inclining relative to the light-emitting surface opposite to the light-entering surface, and a third surface inclining relative to the light-emitting surface toward the light-entering surface; and
a display device, disposed at the side of the light-emitting surface of the front light, comprising a reflecting surface for reflecting the light emitted from the front light,
wherein an angle of inclination of the second surface against the light-emitting surface is between 80 degrees and 90 degrees, and
wherein an angle of inclination of the third surface against the light-emitting surface is between 20 degrees and 40 degrees.

22. The reflective display according to claim 21, wherein the longer side of the patterns is substantially perpendicular to the optical axis of the light source.

23. A reflective display, comprising:
a front light comprising:
a light guide; and
a light source disposed at one side of the light guide,
the light guide comprising a light-entering surface where the light from the light source enters, a light-emitting surface where the light from the light source is emitted outwardly, and a light-reflecting surface opposed to the light-emitting surface,
the light-reflecting surface having a plurality of patterns formed thereon,
each of the patterns comprising a first surface inclining relative to the light-emitting surface toward the light-entering surface, a second surface substantially perpendicular to the light-emitting surface or inclining relative to the light-emitting surface opposite to the light-entering surface, and a third surface inclining relative to the light-emitting surface toward the light-entering surface; and
a display device, disposed at the side of the light-emitting surface of the front light, comprising a reflecting surface for reflecting the light emitted from the front light,
wherein the distance from the light-emitting surface to the top end of the second surface is determined so that the light which enters the first surface with the minimum incident angle reaches the second surface.

24. The reflective display according to claim 23, wherein, the longer side of the patterns is substantially perpendicular to the optical axis of the light source.

* * * * *